(12) United States Patent
Görtz et al.

(10) Patent No.: US 9,120,909 B2
(45) Date of Patent: Sep. 1, 2015

(54) POLYMER-GRAPHITE NANOCOMPOSITES

(75) Inventors: Hans-Helmut Görtz, Freinsheim (DE); Rolf Minkwitz, Mannheim (DE); Rolf Mülhaupt, Freiburg (DE); Rainer Wissert, Voerstetten (DE); Peter Steurer, Goehrwihl (DE)

(73) Assignee: Styrolution Europe GmbH (DE)

( * ) Notice: Subject to any disclaimer, the term of this patent is extended or adjusted under 35 U.S.C. 154(b) by 561 days.

(21) Appl. No.: 13/496,806

(22) PCT Filed: Sep. 13, 2010

(86) PCT No.: PCT/EP2010/063343
§ 371 (c)(1),
(2), (4) Date: Mar. 16, 2012

(87) PCT Pub. No.: WO2011/032899
PCT Pub. Date: Mar. 24, 2011

(65) Prior Publication Data
US 2012/0187348 A1    Jul. 26, 2012

(30) Foreign Application Priority Data
Sep. 18, 2009 (EP) .................................. 09170631

(51) Int. Cl.
H01B 1/06 (2006.01)
C08K 3/04 (2006.01)
H01B 1/24 (2006.01)
C08J 3/215 (2006.01)

(52) U.S. Cl.
CPC . *C08K 3/04* (2013.01); *C08J 3/215* (2013.01); *H01B 1/24* (2013.01); *C08J 2325/12* (2013.01); *C08K 2201/011* (2013.01)

(58) Field of Classification Search
None
See application file for complete search history.

(56) References Cited

U.S. PATENT DOCUMENTS

2005/0020759 A1* 1/2005 Gotou ............................ 524/495
2005/0077503 A1* 4/2005 Gotou et al. .................. 252/502
2006/0231792 A1 10/2006 Drzal et al.
2007/0131915 A1* 6/2007 Stankovich et al. .......... 252/511
2009/0261302 A1* 10/2009 Gotou et al. .................. 252/502

FOREIGN PATENT DOCUMENTS

EP          2216358 A1      8/2010
WO      WO 2009143405 A2 *  11/2009
WO      WO 2010086176 A1 *   8/2010  ............... C08J 3/215

OTHER PUBLICATIONS

English Translation of International Preliminary Report on Patentability of PCT/EP2010/063343 dated Sep. 13, 2010.
Stankovich, Sasha, et al., "Stable Aqueous Dispersions of Graphitic Nanoplatelets via the Reduction of Exfoliated Graphite Oxide in the Presence of Poly(sodium 4-styrenesulfonate)", Journal of Materials Chemistry, vol. 16, (2006), pp. 155-158.
Stankovich, Sasha, et al., "Graphene-based Composite Materials", Nature Letters, vol. 442, (2006), pp. 282-286.
Steurer, Peter, et al., "Functionalized Graphenes and Thermoplastic Nanocomposites Based upon Expanded Graphite Oxide", Macromolecular Rapid Communications, vol. 30, (2009), pp. 316-327.
International Search Report, PCT/EP2010/063343, mailed Dec. 23, 2010.

* cited by examiner

*Primary Examiner* — Harold Pyon
*Assistant Examiner* — Jaison Thomas
(74) *Attorney, Agent, or Firm* — Drinker Biddle & Reath LLP

(57) ABSTRACT

Process for producing a polymer-graphite nanocomposite, which comprises the steps
   a) oxidation of graphite to graphite oxide,
   b) conversion of the graphite oxide into an aqueous dispersion,
   c) mixing of the aqueous dispersion comprising graphite oxide or, if appropriate, reduced graphite oxide which is obtained from b) with an aqueous polymer dispersion comprising at least one polymer and
   d) separating off the polymer-graphite mixture from the aqueous phase,
wherein the graphite oxide which has been oxidized in step a) is reduced to graphite between step b) and c) or between step c) and d).

11 Claims, No Drawings ved
POLYMER-GRAPHITE NANOCOMPOSITES

CROSS-REFERENCE TO RELATED APPLICATIONS

This application is a national stage application (under 35 U.S.C. §371) of PCT/EP2010/063343, filed Sep. 13, 2010, which claims benefit of European Application No. 09170631.7, filed Sep. 18, 2009.

BACKGROUND OF THE INVENTION

The invention relates to a process for producing polymer-graphite nanocomposites, polymer-graphite nanocomposites which can be produced by this process and also the shaped bodies, semifinished parts, films, fibers and foams produced from the polymer-graphite nanocomposites. According to the invention, the graphite is oxidized in the first step of the process, then converted into an aqueous dispersion and mixed with an aqueous polymer dispersion. The polymer-graphite mixture is subsequently separated off from the aqueous phase. During the course of the process, the graphite oxide is reduced again to graphite in an intermediate step. The polymer-graphite nanocomposites produced according to the invention have improved mechanical properties compared to polymer-graphite nanocomposites produced according to the prior art.

Polymers reinforced with fillers have been known for a long time. The intention of the fillers is, in particular, to improve the mechanical properties and the thermal and electrical conductivity of the polymers. Fillers used are various materials such as wood fibers and glass fibers, alumina, carbon black, graphite and carbon nanotubes (CNTs) (see, for example, H.-G. Elias, Macromolecules Volume 4, page 372, Wiley-VCH Verlag Weinheim 2009). Polymers which comprise particles or fibers having a size in at least one dimension below about 100 nm as filler are also referred to as polymer nanocomposites. Fillers which are particularly suitable for this purpose are, for example, alumina platelets, graphite and graphite oxide platelets, carbon nanotubes and silicate nanoplatelets. Polymer nanocomposites display a further improvement in their mechanical properties compared to polymers reinforced with coarser fillers. Carbon nanotubes or graphite as nanosize fillers can, when they are used in the appropriate concentrations, make the polymer nanocomposite conductive, with graphite having a significant cost advantage over carbon nanotubes.

One difficulty in the production of polymer nanocomposites is dispersion of the nanoparticles in the polymer, since they should be as uniformly and finely distributed therein as possible. To produce a polymer-graphite nanocomposite, the graphite which has a layer structure should firstly be converted into nanoparticles or be brought into a form which allows conversion of the graphite into nanoparticles during mixing with the polymer. The graphite nanoparticles are subsequently mixed with the polymer.

US 2006/0231792 A1 discloses firstly expanding graphite by heating by means of microwaves or radio waves and comminuting the platelets formed to a length below 200 μm. The graphite platelets are subsequently mixed with polymers such as polyamides, polyolefins and polycarbonate in a blender.

S. Stankovic et. al., Nature 2006, Vol. 442, pages 282-286, disclose graphite-based composites which are produced by mixing a solution of polystyrene and graphite oxide platelets which have been treated with vinyl isocyanate in methylformamide and subsequently reducing the graphite oxide by means of dimethylhydrazine. The polystyrene-graphite nanocomposite is separated off by precipitation in methanol. A disadvantage of this process is the treatment of the graphite oxide platelets with vinyl isocyanate, which represents an additional process step and also introduces an additional component into the composite.

S. Stankovic et. al., J. Mater Chem. 2006, 16, pages 155-158, describe the production of stable, aqueous dispersions of reduced graphite oxide nanoplatelets, which is, as a result of the presence of an anionic polymer such as the sodium salt of poly-4-styrenesulfonic acid, made possible in the reduction in the aqueous phase. Here, the reduced graphite oxide nanoplatelets are coated with the anionic polymer.

P. Steuer et. al., Macromol. Rapid Commun. 2009, 30, pages 316-327, describe polymer-graphite nanocomposites which comprise firstly oxidized and subsequently thermally reduced graphite. The composites are obtained by mixing the thermally reduced graphite with a solution of the respective polymer or by dispersing the thermally reduced graphite in acetone and adding powdered polyamide, and subsequently drying and compounding the mixture.

Despite the processes known from the prior art for producing polymer-graphite nanocomposites, there is a need to produce polymer-graphite nanocomposites which have further improved properties, in whose production as few as possible additional components are introduced and which are very simple to produce.

DETAILED DESCRIPTION OF THE INVENTION

This object is achieved by a process for producing a polymer-graphite nanocomposite, which comprises the steps
  a) oxidation of graphite to graphite oxide,
  b) conversion of the graphite oxide into an aqueous dispersion,
  c) mixing of the aqueous dispersion comprising graphite oxide or, if appropriate, reduced graphite oxide which is obtained from b) with an aqueous polymer dispersion comprising at least one polymer and
  d) separating off the polymer-graphite mixture from the aqueous phase,
wherein the graphite oxide which has been oxidized in step a) is reduced to graphite between step b) and c) or between step c) and d), and also polymer-graphite nanocomposites which can be produced by this process.

The polymer-graphite nanocomposites of the invention surprisingly display improved mechanical properties compared to polymer-graphite nanocomposites which comprise untreated graphite, conductive graphite or expandable graphite as filler. In addition, the polymer-graphite nanocomposites of the invention are very suitable as concentrates, known as masterbatches, for the simple introduction of finely dispersed graphite nanoplatelets into polymers, for example by coextrusion of the concentrate and the polymer or polymers. A particular advantage of the production process is that it is carried out using water as dispersion medium, i.e. no organic solvents are employed and the associated problems in respect of environmental compatibility and handling (e.g. fire risk) are avoided. Furthermore, polymers which are obtained as an aqueous dispersion or suspension from their production process can be used directly in the process of the invention, i.e. without the polymers being separated off and worked up. These steps can thus be saved.

For the purposes of the invention, polymer-graphite nanocomposites are mixtures comprising graphite platelets and at least one polymer, with the graphite platelets being smaller than 100 nm in at least one dimension.

In step a) of the process of the invention, graphite is oxidized to graphite oxide.

Oxidation incorporates oxygen atoms into the graphite and alcohol, epoxy, carbonyl or carboxyl groups, in particular, are formed. These groups increase the spacings between the individual layers and the layers can be separated from one another more easily. The oxidized graphite layers are, in addition, made hydrophilic by the oxygen-comprising groups and can be dispersed more readily in water.

Oxidized graphite is usually produced by treatment of graphite with an oxidizing agent and an acid, in particular a strong acid. As oxidizing agents, use is made of, in particular, chlorates and permanganates, and acids used are, in particular, sulfuric acid and nitric acid.

L. Staudenmaier, Ber. Dt. Chem. Ges. 31, (1898), 1481, and L. Staudenmaier, Ber. Dt. Chem. Ges. 32, (1899), 1394, describe the preparation of oxidized graphite, there referred to as graphitic acid, by reaction of graphite with potassium chlorate in the presence of fuming nitric acid and concentrated sulfuric acid.

W. S. Hummers, R. E. Offeman, J. Am. Chem. Soc. 80 (1958), 1339, describe the preparation of oxidized graphite by reaction of graphite with sodium nitrate and potassium permanganate in the presence of sulfuric acid.

B. C. Brody, Phil. Trans. Roy. Soc. London, Ser. A 149, Liebigs Ann. Chem. 114, 6 (1860), describes the preparation of oxidized graphite by reaction of graphite with sodium chlorate and fuming nitric acid.

As an alternative, oxidized graphite can be prepared by means of water vapor at elevated temperatures below 1300° C. (cf. F. Delannay, W. T. Tysoe, H. Heinemann, G. A. Somorjai, Carbon 1984, 22 (4/5), pp. 401 to 407). It is likewise possible for the oxidation to be carried out in an atmosphere comprising at least one gas comprising oxygen atoms in the molecule, e.g. oxygen, ozone, nitrogen oxides, sulfur oxides, carbon monoxide, carbon dioxide and water vapor. Preference is given to using mixtures of carbon monoxide, carbon dioxide and water vapor, oxygen and/or ozone or nitrogen oxides and/or sulfur oxides. Care has been taken here to ensure that the graphite is not oxidized too far by temperatures which remain high so that it decomposes into carbon dioxide.

A further possible way of preparing oxidized graphite is the corona technique or in particular a plasma process. Here, it is possible to employ either a low-pressure plasma process in a vacuum chamber or the atmospheric-pressure plasma process. In both cases, graphite powder is sprinkled in finely divided form onto a surface. The plasma is applied to the graphite particles by means of one or more plasma nozzles and thereby oxidizes the particles to graphite oxide. This can be effected in an air atmosphere or by introduction of gases or gas mixtures comprising oxygen atoms in the molecule, for example carbon monoxide, carbon dioxide, sulfur oxides, oxygen, water vapor, ozone and/or nitrogen oxides, into the plasma nozzle. One variant comprises using nitrogen or ammonia as sole gas or as component of the gas mixture in order to produce nitrogen-comprising polar functional groups on the graphite surface. This can be carried out in addition to the incorporation of oxygen.

The graphite oxide formed is in any case a usually dark, voluminous solid. The minimum content of oxygen in the oxidized graphite, determined by elemental analysis, is preferably >10%, particularly preferably >15%. Oxygen contents greater than 50% are generally not possible using the methods described.

It is also possible to use expandable graphite as precursor for preparing the oxidized graphite. In this case, the graphite is expanded in the first step. The product obtained is then, for example, milled in a ball mill. Finally, chemical modification as described above is effected either by thermal oxidation or by oxidation in the presence of sulfuric acid.

If the graphite platelets or oxidized graphite platelets are still too large, they are comminuted, for example by milling, before conversion into the aqueous dispersion. According to the invention, the graphite nanoparticles in the polymer-graphite nanocomposite are platelet-like with a thickness of not more than 100 nm, a width of not more than 500 nm and a length of not more than 500 nm; preference is given to both the width and the length being not more than 400 nm. The graphite nanoparticles preferably have the geometry of the graphite used.

In step b) of the process, the graphite oxide platelets are converted by means of water into an aqueous dispersion using the customary methods known to those skilled in the art for producing solid/liquid dispersions. This can be effected by means of ultrasound, stirring apparatuses and dispersing apparatuses, e.g. an Ultra-Turrax® stirrer.

The aqueous dispersion comprising graphite oxide from step b) usually comprises from 0.01 to 5% by weight and particularly preferably from 0.5 to 2% by weight of graphite oxide particles, based on the total weight of the dispersion.

In the further course of the process of the invention, the graphite oxide is reduced to graphite between step b) and c) or between step c) and d). The reduction is preferably carried out chemically by addition of a reducing agent to the aqueous dispersion comprising graphite oxide. The reducing agent is preferably selected from the group consisting of $NaBH_4$, diisobutylaluminum hydride, Zn/HCl, hydrazine, hydrazine substituted by organic radicals, e.g. methylhydrazine, dimethylhydrazine and phenylhydrazine, hydroquinone, N,N-diethylhydroxylamine, sodium thiosulfate, sodium sulfite, dithionite, formaldehyde/sodium hydroxide, vitamin C, derivatives of vitamin C and mixtures thereof. Particular preference is given to using vitamin C and derivatives thereof, and very particular preference is given to vitamin C. For the purposes of the invention, derivatives of vitamin C are derivatives of vitamin C which have the same basic structure as vitamin C and likewise act as reducing agents. Such derivatives are known to those skilled in the art.

The reduction in step c) in the aqueous dispersion comprising polymer and graphite oxide is preferably carried out chemically by addition of a reducing agent. Reduction of the graphite oxide leads to destabilization of the dispersion and the reduced graphite oxide and the polymer precipitate together.

The reduction of the graphite oxide is usually carried out at weight ratios of graphite oxide/reducing agent of from 5:1 to 1:5, preferably at a weight ratio of from 1:1 to 1:5. However, an excess of the reducing agent is frequently not necessary, so that the reduction is particularly preferably carried out at a weight ratio of about 1:1.

In step c), the aqueous graphite or graphite oxide dispersion is mixed with an aqueous polymer dispersion. For the present purpose, the term "aqueous polymer dispersion" refers to a two-phase mixture of aqueous matrix phase with solid polymer particles dispersed therein. In addition, auxiliaries such as surfactants, protective colloids, starter molecules, cosolvents and similar compounds originating from the preparation of the polymer or polymers or used for production of the polymer dispersion can be comprised. The aqueous polymer dispersions preferably comprise, according to the invention, polymer particles which have a particle diameter of from 0.01 micron to 3000 microns, preferably from 0.01 micron to 100 microns and particularly preferably from 1 micron to 10 microns.

According to the invention, the aqueous polymer dispersion comprises at least 2% by weight of one or more polymers, based on the total weight of the polymer dispersion used; the polymer content of the aqueous polymer dispersion is preferably from 5 to 65% by weight, particularly preferably from 5 to 60% by weight, in each case based on the total weight of the polymer dispersion used.

As aqueous polymer dispersion, it is possible to use primary dispersions, secondary dispersions or a mixture of the two in step c). Primary dispersions are polymer dispersions which have been formed directly in the production process of the polymer, in particular by emulsion polymerization or suspension polymerization.

According to the invention, emulsion polymerization and suspension polymerization include all polymerization processes in which an aqueous, two-phase mixture comprising finely dispersed solid polymer particles is formed. These include suspension bead polymerization and suspension powder polymerization, macroemulsion polymerization, miniemulsion polymerization and microemulsion polymerization, as are described, for example, in H.-G. Elias, Macromolecules Vol. 2, pages 158-170, Wiley-VCH Verlag Weinheim 2007. According to the invention, preference is given to using primary dispersions formed by emulsion polymerization or suspension polymerization. The process of the invention is therefore particularly suitable for producing polymer-graphite nanocomposites from polymers which can be prepared by means of emulsion or suspension polymerization since these are obtained as polymer dispersions in the production process and can be used as such directly in the present process. Polymer-graphite nanocomposites derived from these polymer dispersions are therefore particularly simple to produce in particularly few process steps.

Secondary dispersions are, according to the invention, polymer dispersions which are produced by dispersing a polymer in an aqueous phase. This can be effected, for example, by precipitating a water-insoluble polymer dissolved in a solvent in the aqueous phase or by dispersing finely milled polymer particles in water.

According to the invention, the aqueous polymer dispersions comprise one, two, three or more polymers. According to the invention, the general term "polymers" encompasses both homopolymers and copolymers. The copolymers can comprise two, three or more different types of monomer, and the copolymers can be block polymers, random and alternating copolymers and also graft copolymers.

According to the invention, the aqueous polymer dispersion preferably comprises at least one thermoplastically processable polymer. A "thermoplastically processable polymer" is, for the present purposes, a polymer which is able to be processed further by the customary processes known to those skilled in the art for mixing and shaping, etc., thermoplastic polymers. In particular, it means that the polymer can be processed and/or shaped repeatedly above its glass transition temperature. Further-processing and shaping processes include, in particular, kneading, calendering, extrusion and extruding processes such as fiber spinning, blown film processes and blow molding and also injection molding. Thermoplastically processable polymers include, in particular, the polymers which are generally referred to as thermoplastic polymers and also the polymers referred to as thermoplastic elastomers.

The at least one polymer comprised in the aqueous polymer dispersion is preferably selected from the group consisting of polystyrene, polyolefins, poly(meth)acrylates, polyamides, polycarbonate, polyalkylene terephthalates, polyvinyl chloride, polyvinylidene fluoride, polytetrafluoroethylene, polyacrylonitrile, polyoxymethylene, polyimides, polycaprolactam, polyacetate and copolymers thereof, styrene-acrylonitrile copolymers (SAN), acrylonitrile-butadiene-styrene copolymers, butadiene-styrene copolymers, high-impact polystyrenes, styrene-maleic anhydride copolymers, acrylonitrile-styrene-acrylamide copolymers, styrene-(meth) acrylate copolymers, styrene-maleimide copolymers and thermoplastic polyurethanes. Particular preference is given, according to the invention, to using an aqueous polymer dispersion which comprises at least one polymer selected from the group consisting of SAN, polystyrene, polyolefins, poly(meth)acrylates, acrylonitrile-butadiene-styrene copolymers and butadiene-styrene copolymers.

The polymer-graphite nanocomposite comprises, according to the invention, from 5 to 99% by weight of at least one polymer and from 1 to 95% by weight of graphite, based on the total weight of the polymer-graphite nanocomposite, preferably from 80 to 99% by weight, particularly preferably from 90 to 95% by weight, of at least one polymer and preferably from 1 to 20% by weight, particularly preferably from 5 to 10% by weight, of graphite.

In the reduction, the graphite oxide is usually not reduced completely to graphite, i.e. some oxygen-comprising functional groups remain on the reduced graphite oxide nanoplatelets. For example, a carbon content of from 81 to 97% can be achieved in the thermal reduction of graphite oxide (see P. Steuerer, Macromol Rapid Commun 2009, 30, pages 316-327). In the chemical reduction by means of vitamin C, too, 100% reduction is not achieved, as shown in the examples below. Since functional oxygen-comprising-groups always remain on the graphite nanoparticles in the reduction according to the invention of the initially oxidized graphite oxide, the terms graphite nanoparticles and reduced graphite oxide nanoparticles are used synonymously in the context of the polymer-graphite nanocomposites of the invention.

In step d) of the process, the polymer-graphite mixture and the aqueous phase are separated from one another. This can be carried out by means of the customary processes known to those skilled in the art for the separation of solids from the liquid phase, for example by filtration, centrifugation or decantation. The water can also be separated off by spray drying or freeze drying. Separation processes such as filtration, centrifugation and decantation have the advantage that the reducing agent used is removed with the aqueous phase from the polymer-graphite mixture, while the reducing agent used remains in the polymer-graphite mixture when the aqueous phase is separated off by drying.

The polymer-graphite nanocomposite obtained in this way is, in one embodiment of the invention, washed one or more times, preferably with water, before further processing.

According to the invention, preference is given to additionally drying the polymer-graphite nanocomposite, for example by spray drying, freeze drying, oven drying or air drying, before further processing.

The polymer-graphite nanocomposites of the invention can comprise not only polymer and graphite nanoparticles and possibly compounds originating from the preparation of the polymer or the polymer dispersion but also further auxiliaries which are customarily used in polymers, e.g. antioxidizing agents, processing aids, lubricants and mold release agents, stabilizers, plasticizers, flame retardants, colorants, etc. They are generally present in a proportion of from 0 to 45% by weight, preferably from 0 to 20% by weight, in particular from 0 to 10% by weight, based on the total weight of the polymer-graphite nanocomposite. If one of the abovementioned auxiliaries is present in the polymer-graphite nanocomposites of the invention, it is present in an amount of at least 0.1% by weight, based on the total weight of the polymer-graphite nanocomposite.

The present invention further provides polymer-graphite nanocomposites which can be produced by the above-described process. The present invention likewise provides for the use of the polymer-graphite nanocomposites which can be produced by the above-described process for producing moldings, semifinished parts, films, fibers and foams.

The present invention further provides for the use of the polymer-graphite nanocomposite which can be produced by the above-described inventive process as concentrate for introducing graphite nanoparticles into thermoplastically processable polymers. The concentrate is used as what is referred to as a masterbatch. Particular preference is given to using the polymer-graphite nanocomposite of the invention as graphite particle concentrate having a proportion by weight of reduced graphite oxide nanoparticles of at least 15% by weight, preferably at least 20% by weight and particularly preferably at least 30% by weight, in each case based on the total weight of the polymer-graphite nanocomposite.

The use of the polymer-graphite nanocomposite of the invention as concentrate represents a simple way of producing polymer-graphite nanocomposites by mixing one or more polymers with the concentrate. The at least one polymer is preferably one or more thermoplastically processable polymers, in particular one or more polymers which are already comprised in the polymer-graphite nanocomposite concentrate.

The present invention further provides a process for producing moldings, semifinished parts, films, fibers and foams comprising a polymer-graphite nanocomposite which can be produced by the above-described process, which comprises i) optionally mixing a polymer-graphite nanocomposite which can be produced by the above-described process with at least one polymer and ii) shaping the polymer-graphite nanocomposite which has optionally been mixed with at least one thermoplastic polymer to produce moldings, semifinished parts, films, fibers and foams.

The at least one polymer in step i) is preferably one or more thermoplastically processable polymers, in particular one or more polymers which are already comprised in the polymer-graphite nanocomposite concentrate.

The present invention likewise provides moldings, semifinished parts, films, fibers and foams which comprise a polymer-graphite nanocomposite which can be produced by the process of the invention.

The invention is illustrated below with the aid of examples.

EXAMPLES

Example 1

Synthesis of Graphite Oxide (GO)

Graphite KFL (Kropfmühl AG, C content >99.5%) was converted into graphite oxide in concentrated sulfuric acid by the method of Hummers (W. S. Hummers, R. E. Offeman, J. Amer. Chem. Soc. 1958, 80, 1339). For this purpose, graphite (80 g) was dispersed in sulfuric acid (2 l). After addition of $NaNO_3$ (40 g) to the stirred dispersion, the mixture was stirred for a further one hour and subsequently cooled to 0° C. by means of an ice water bath. $KMnO_4$ was then added slowly and a little at a time over a period of 5 hours. The reaction mixture was stirred at room temperature for a further 2 hours. After the reaction was complete, the dispersion was poured into an ice water bath (0.5 l). The excess $KMnO_4$ was destroyed by addition of a few milliliters of $H_2O_2$ (5% by weight). The product was filtered off and washed with aqueous hydrochloric acid solution until a sulfate test on the washing water by means of $BaCl_2$ was negative. The product was subsequently washed with distilled water until a test for chloride by means of $AgNO_3$ was negative. The product was dried by means of freeze drying and milled by means of a centrifugal mill (Retsch, Z 100) to a particle size of 80 μm.

Example 2

Production of an SAN (Styrene-Acrylonitrile Copolymer)-Graphite Nanocomposite

Graphite oxide (GO) (360 mg) was dispersed in 36 ml of water by means of an Ultra-Turrax® stirrer at about 15 000-20 000 rpm for 15 minutes and added to an emulsion of SAN in water (ESAN, BASF SE, 30% solids content, 6 ml, 1.8 g of SAN). The GO-ESAN dispersion obtained in this way was subsequently stirred at room temperature for 2 hours before a solution of vitamin C (Vit C) (360 mg in 5 ml of water) was added and the mixture was refluxed for 24 hours. After the reaction was complete, a black solid settled out, and the supernatant liquid was slightly yellowish. The black product was filtered off and washed with water (5×50 ml). For TEM analyses, the black solid was dispersed in water (50 ml) by means of an ultrasonic bath.

Example 3

Production of a Polybutyl Acrylate-Graphite Nanocomposite

Graphite oxide (GO) (360 mg) was dispersed in 36 ml of water by means of an Ultra-Turrax® stirrer at about 15 000-20 000 rpm for 15 minutes and added to an emulsion of polybutyl acrylate (BA) in water (BA, BASF SE, 34% solids content, 5.3 ml, 1.8 g of SAN). The GO-BA dispersion obtained in this way was subsequently stirred at room temperature for 2 hours before a solution of vitamin C (Vit C) (360 mg in 5 ml of water) was added and the mixture was refluxed for 24 hours. After the reaction was complete, a black solid settled out, and the supernatant liquid was slightly yellowish. The black product was filtered off and washed with water (5×50 ml). For TEM analyses, the black solid was dispersed in water (50 ml) by means of an ultrasonic bath.

Example 4

Regraphitization of the Graphite Oxide (without Latex)

GO (0.5 g) was dispersed in distilled water (50 ml) by means of an Ultra-Turrax® stirrer (power: 15 000 rpm) for 2×5 minutes. A solution of Vit C in distilled water (0.5 g of Vit C) was subsequently added to the graphite dispersion. Chemical reduction was carried out at 100° C. under reflux for 24 hours. The black product was filtered off and washed with distilled water (4×50 ml). An increase in the proportion of C compared to the starting material GO was able to be observed by means of elemental analysis. The C content could be increased from about 59% by weight to about 80% by weight by means of the chemical reduction. The electrical conductivity of the pure, chemically reduced GO was found to be 250 Ωcm.

The same result is obtained when the Vit C is added in excess (GO/VitC weight ratio: 1:3). The C content can thus be increased to a maximum of about 80% by the chemical route using Vit C.

Example 5

Production of Test Specimens Using the SAN-Graphite Nanocomposites as Concentrates (Masterbatches)

According to the Invention or from the Comparative Experiments a) Pure SAN and the SAN-graphite nanocomposite from example 2 were comminuted to a particle size of 1 mm by means of a Retsch ZM100 centrifugal mill before mixing so that a homogeneous powder mixture could be produced. The powder mixtures were dried at 60° C. for 12 hours immediately before processing.

b) Commercially available graphite and carbon nanoparticles (MWCNTs (multiwall carbon nanotubes, lolitec), CB (Carbon Black Printer XE2B, Evonik AG), babytubes, expandable graphite (Kropfmühl), conductive graphite (Kropfmühl) and graphite KFL 99.5 (Kropfmühl)) were mixed dry as powder with the pulverulent SAN by means of a spatula.

Processing of the polymer mixtures from a) and b) was carried out in a DSM Xplore 5 ml microcompounder and subsequent injection molding by means of a DSM Xplore 5.5 ml injection molding machine from DSM to produce the tensile test specimens in accordance with DIN EN ISO 527-1 type 5A. All composites were homogenized at a rotational speed of 100 rpm for three minutes at a processing temperature of 210° C.

Example 6

Testing of the Test Specimens in a Tensile Test

The test specimens obtained by injection molding were measured by a method based on the test standard ISO 527 using a Zwick testing machine (model Z-005). The distance between the clamping heads was 40 mm. The measurement was carried out using a 5 kN load cell. The crosshead speed was 1 mm/min. The E modulus was determined by the secant method by determining the gradient of the straight lines through the measurement point at 0.05% and 0.25%. 4 to 5 test specimens per sample were measured and the mean and standard deviation were determined from the measured values. The control of the machine and data evaluation were carried out using the Zwick Text Xpert Software Version 11.0 in accordance with ISO 527.

The results are shown in table 1.

TABLE 1

| Composition | Type of filler | Proportion of filler [% by weight] | E modulus [MPa] |
| --- | --- | --- | --- |
| A SAN VLP | — | 0 | 2360 ± 10 |
| B1 SAN/5% CrGO (according to the invention) | Chem red. GO | 5 | 2920 ± 20 |
| B2 SAN/10% CrGO (according to the invention) | Chem red. GO | 10 | 3100 ± 20 |
| C1 SAN/5% MWCNT | MWCNT (lolitec) | 5 | 2500 ± 10 |
| C2 SAN/10% MWCNT | MWCNT (lolitec) | 10 | 2600 ± 30 |
| D1 SAN/5% CB | Carbon Black Printer XE2B | 5 | 2510 ± 20 |
| D2 SAN/10% CB | Carbon Black Printer XE2B | 10 | 2670 ± 10 |
| E1 SAN/5% babytubes | Babytubes | 5 | 2540 ± 20 |
| E2 SAN/10% babytubes | Babytubes | 10 | 2760 ± 10 |
| F1 SAN/5% expandable graphite | Expandable graphite (Kropfmühl) | 5 | 2460 ± 50 |
| F2 SAN/10% expandable graphite | Expandable graphite (Kropfmühl) | 10 | 2660 ± 50 |
| G1 SAN/5% conductive graphite | Conductive graphite (Kropfmühl) | 5 | 2610 ± 100 |
| G2 SAN/10% conductive graphite | Conductive graphite (Kropfmühl) | 10 | 2920 ± 80 |
| H1 SAN/5% KFL | Graphit KFL 99.5 (Kropfmühl) | 5 | 2500 ± 40 |
| H2 SAN/10% KFL | Graphit KFL 99.5 (Kropfmühl) | 10 | 2870 ± 100 |

The invention claimed is:

1. A process for producing a polymer-graphite nanocomposite, which comprises the steps
   a) oxidizing graphite to graphite oxide,
   b) converting the graphite oxide into an aqueous dispersion,
   c) mixing the aqueous dispersion comprising graphite oxide or, if appropriate, reduced graphite oxide which is obtained from b) with an aqueous polymer dispersion comprising at least one polymer and
   d) separating off the polymer-graphite mixture from the aqueous phase,
   wherein the graphite oxide which has been oxidized in step a) is reduced to graphite between step b) and c) or between step c) and d); and
   wherein the polymer particles in the aqueous polymer dispersion have a particle diameter of from 0.01 micron to 3000 microns.

2. The process according to claim 1, wherein the polymer-graphite nanocomposite comprises from 5 to 99% by weight of at least one polymer and from 1 to 95% by weight of reduced graphite oxide, based on the total weight of the graphite nanocomposite.

3. The process according to claim 1, wherein the graphite oxide is chemically reduced to graphite by addition of a reducing agent between step b) and c) or between step c) and d).

4. The process according to claim 1, wherein the reducing agent is selected from the group consisting of NaBH$_4$, diisobutylaluminum hydride, Zn/HCl, hydrazine, hydrazine substituted by organic radicals, hydroquinone, N,N-diethylhydroxylamine, sodium thiosulfate, sodium sulfite, dithionite, formaldehyde/sodium hydroxide, vitamin C, derivatives of vitamin C and mixtures thereof.

5. The process according to claim 1, wherein the aqueous polymer dispersion comprises at least 2% by weight of one or more polymers, based on the total weight of the aqueous polymer dispersion.

6. The process according to claim 1, wherein a primary dispersion, a secondary dispersion or a mixture of the two is used as aqueous polymer dispersion.

7. The process according to claim 1, wherein the polymer dispersion comprises at least one thermoplastically processable polymer.

8. The process according to claim 1, wherein the polymer dispersion comprises at least one polymer selected from the group consisting of polystyrene, polyolefins, poly(meth)acrylates, polyamides, polycarbonate, polyalkylene terephthalates, polyvinyl chloride, polyvinylidene fluoride, polytetrafluoroethylene, polyacrylonitrile, polyoxymethylene, polyimides, polycaprolactam, polyacetate and copolymers thereof, styrene-acrylonitrile copolymers, acrylonitrile-butadiene-styrene copolymers, butadiene-styrene copolymers, high-impact polystyrenes, styrene-maleic anhydride copolymers, acrylonitrile-styrene-acrylamide copolymers, styrene-(meth)acrylate copolymers, styrene-maleimide copolymers and thermoplastic polyurethanes.

9. The process according to claim 1, wherein the polymer dispersion comprises at least one polymer selected from the group consisting of SAN, polystyrene, polyolefins, poly(meth)acrylates, acrylonitrile-butadiene-styrene copolymers and butadiene-styrene copolymers.

10. A process for producing moldings, semifinished parts, films, fibers and foams comprising a polymer-graphite nanocomposite, which comprises i) producing the polymer-graphite nanocomposite by the process according to claim 1;

ii) optionally mixing the polymer-graphite nanocomposite with at least one polymer; and iii) shaping the polymer-graphite nanocomposite which has optionally been mixed with at least one polymer to produce moldings, semifinished parts, films, fibers and foams.

11. The process according to claim 4, wherein the organic radicals are selected from the group consisting of methylhydrazine, dimethylhydrazine, phenylhydrazine and mixtures thereof.

* * * * *